(No Model.) 2 Sheets—Sheet 1.

T. E. BROWN, Jr. & R. H. THORPE.
APPARATUS FOR CONTROLLING SPEED OF FLUIDS FLOWING THROUGH PIPES.

No. 569,781. Patented Oct. 20, 1896.

(No Model.)  2 Sheets—Sheet 2.

T. E. BROWN, Jr. & R. H. THORPE.
APPARATUS FOR CONTROLLING SPEED OF FLUIDS FLOWING THROUGH PIPES.

No. 569,781. Patented Oct. 20, 1896.

Witnesses
J. G. Hinkel
I. A. Fairgrieve

Inventors
Thomas E. Brown Jr.
Robert Henry Thorpe
Josee Freeman
Attorneys.

THE NORRIS PETERS CO., PHOTO-LITHO., WASHINGTON, D. C.

UNITED STATES PATENT OFFICE.

THOMAS E. BROWN, JR., AND ROBERT H. THORPE, OF NEW YORK, N. Y., ASSIGNORS TO THE NATIONAL COMPANY, OF CHICAGO, ILLINOIS.

APPARATUS FOR CONTROLLING SPEED OF FLUID FLOWING THROUGH PIPES.

SPECIFICATION forming part of Letters Patent No. 569,781, dated October 20, 1896.

Application filed August 9, 1894. Serial No. 519,878. (No model.)

*To all whom it may concern:*

Be it known that we, THOMAS E. BROWN, Jr., a citizen of the United States, and ROBERT HENRY THORPE, a subject of the Queen of Great Britain, residing in the city, county, and State of New York, have invented certain new and useful Apparatus for Controlling the Speed of Fluid Flowing Through Pipes, of which the following is a specification.

Our invention relates to apparatus for controlling the speed of a fluid flowing through a pipe, and it has for its object to provide a simple, cheap, and effective construction and arrangement of such apparatus, whereby the speed of the fluid may be controlled in the manner and for the purposes hereinafter pointed out; and our invention consists in the various features of construction, arrangement, and operation of parts, substantially as hereinafter set forth.

Figure 1:
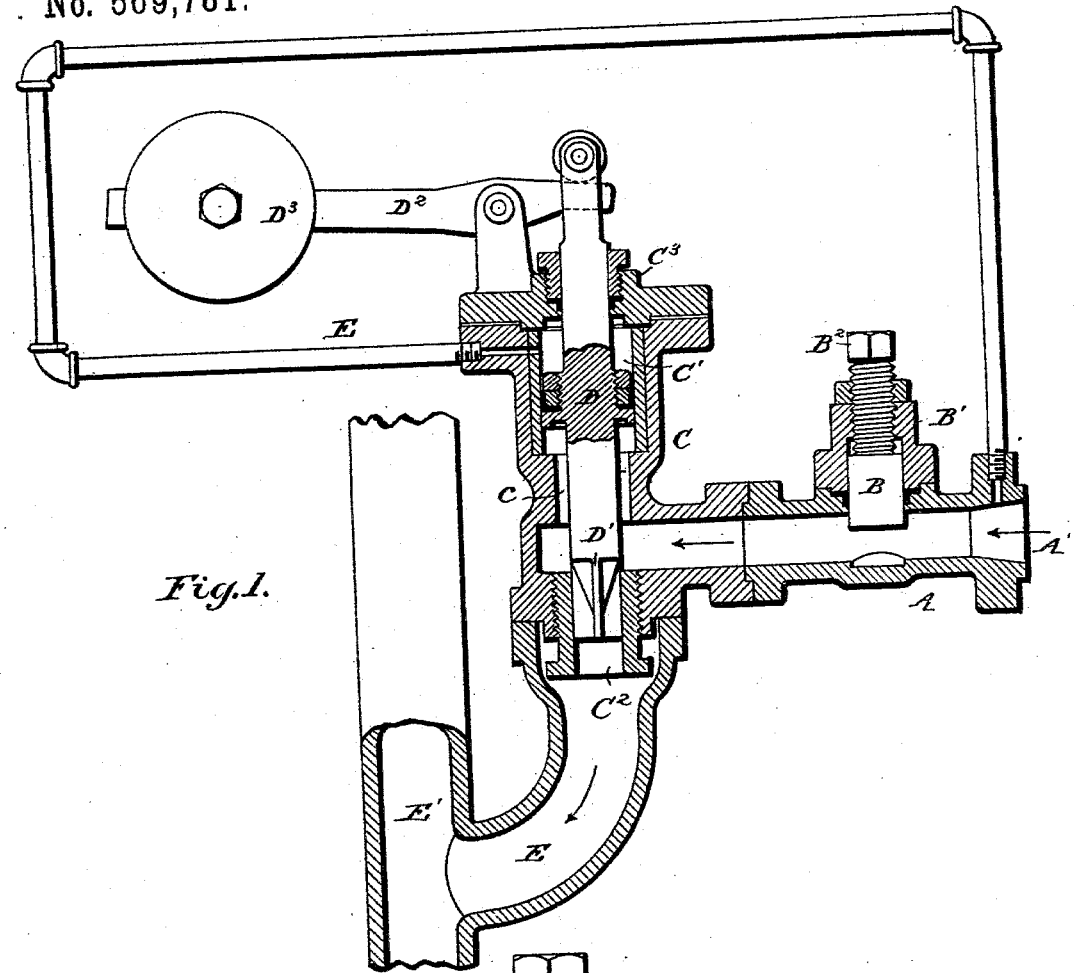
Figure 4:
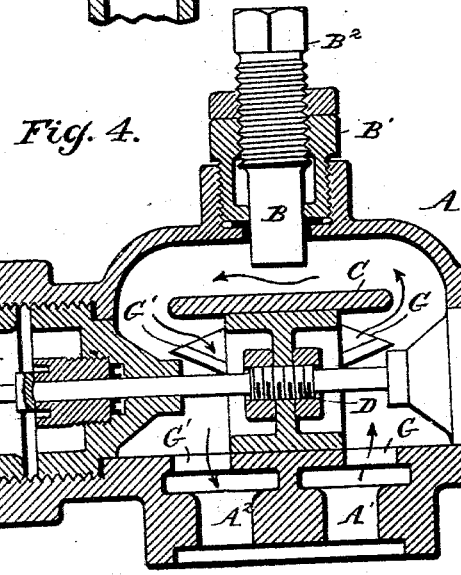
Figure 2:
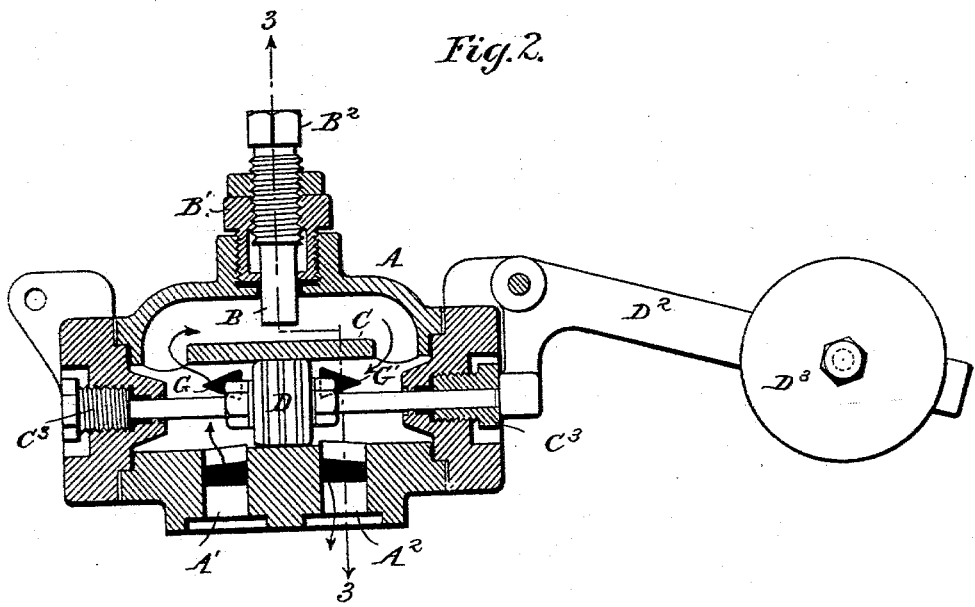
Figure 3:
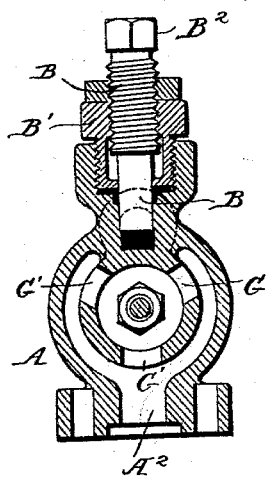

Referring to the accompanying drawings, Figure 1 is a side view, partly in section, of an apparatus embodying our invention, wherein the flow of the fluid is in one direction only. Fig. 2 is a vertical longitudinal section of a portion of an apparatus arranged to control the speed of the fluid in both directions. Fig. 3 is a vertical transverse section of Fig. 2 on the line 3 3, and Fig. 4 is a vertical longitudinal section of an apparatus for controlling the speed of the fluid in both directions with a slightly modified arrangement.

Our invention is adapted to control the speed of fluids flowing through a pipe for many and various purposes and in various connections, and it is especially adapted for such use in connection with hydraulic elevating or lifting apparatus, and the embodiments herein shown of our invention are adapted for use more especially in this latter connection, but, of course, they may be used for many and various purposes, and the details of construction and arrangement of parts can be varied to suit the exigencies of any particular case without departing from the spirit of our invention.

The invention is dependent upon the principle that if a constant difference of head be maintained between the two sides of an aperture of fixed area the velocity of flow of the fluid through said aperture will be constant, and consequently the quantity of fluid passing through said aperture in a given time will be constant, and this constant flow will be entirely independent of the particular pressure to which the fluid may be subjected at any particular time. Of course, by varying the relations between the pressures or head on the two sides of the aperture a variation in the velocity of flow corresponding thereto will be produced, and by adjusting the area of the orifice any desired speed can be had, and where the speed is predetermined and fixed the area of the orifice or aperture may be determined by calculation or experiment and be fixed.

With this general statement as to the principle on which our invention is based, we will now proceed to describe the means by which it is embodied, as shown in the accompanying drawings.

A represents a pipe which may be connected with any source of supply through the orifice A', and which pipe is throttled at B by some suitable means, and while, as before stated, this may be a permanent throttle, in some cases it is preferable to have an adjustable throttle, and we have shown the throttle B in the form of a plug mounted in a suitable box B', connected to the pipe A and controlled by a screw $B^2$, by means of which an accurate adjustment may be obtained. This pipe A is connected in the present instance to a cylinder C, in the opening C' of which is mounted a piston D, and which opening is in communication with the outflow side of the pipe A through the medium of the passages $c\ c'$, so that the fluid on the outflow side of the throttle is in direct communication with one side of the piston D. The other side of the piston is in direct communication with the inflow side of the pipe A or with the source of supply thereof by some suitable means, in the present instance a pipe E being shown communicating with the opening C' of the cylinder C above the piston D and with the inflow side of the pipe A, so that the pressure of the inflowing fluid is exerted directly on one side of the piston. The lower end of the piston is provided with a movable plug D', which opens and closes the outlet $C^2$ of the cylinder as the piston rises and falls in the opening C' thereof. The other end of the stem of the piston is carried through the stuffing-box C³ and is provided with some sort of a counterweight device (shown in the present instance as a lever D²) having an adjustable weight D³, the lever being pivoted in bearings on the stuffing-box and passing through an opening in the stem of the piston, which is preferably provided with a friction-roller or other suitable and well-known means.

The outlet C² discharges into a pipe E, which may be connected to any suitable receiver E', which is shown in the present instance as the pipe of a hydraulic lifting apparatus, through which the fluid flows in different directions under various conditions not necessary to specify herein.

In Fig. 2 we have shown a similar embodiment, except that the apparatus is designed to control the flow of fluid in both directions, and in this case the pipe A is provided with an inlet or orifice A' and an outlet or orifice A², (although the relations of these orifices may be reversed,) and with a throttle B, which is shown adjustable, the cylinder C being inside the pipe A and the piston D being arranged therein and having its stem extending laterally in both directions through the stuffing-boxes C³ C³, and connected to be operated by a lever D², having a weight D³, as before, only one lever being shown for sake of clearness, and it will be seen that it embodies in a different form the essential features of the structure shown in Fig. 1.

In Fig. 4 a similar arrangement is shown for controlling the flow in both directions, which is a practical duplication of the apparatus shown in Fig. 1, except that the piston D itself in this instance, as in Fig. 2, operates to close openings G G' in the cylinder by sliding over them in the manner hereinafter described, and instead of the weighted levers for maintaining the desired difference of pressure on the opposite sides of the throttle small pressure-chambers I are provided at each end, in which extend the plungers K K', connected to the piston, and these chambers are connected by the pipes H to some suitable source, as, for instance, the initial pressure supply, so that the pressure on the plungers K K' can be regulated or controlled. It will be seen that these chambers and plungers are to all intents and purposes the equivalent of the weighted lever of Fig. 1, but they are particularly advantageous when the apparatus is used in connection with lifting machinery, such as elevators, as with this arrangement the piston D is held back from closing the apertures G G', as the case may be, by reason of the pressure in one of the chambers I, which in such case will be obtained from the initial pressure supply, and should this supply fail from any accidental cause, such as the bursting of the pipes, accumulators, or other connecting mechanism, while the load was being lifted, the load would not fall rapidly, as the piston D would immediately close the outlet-aperture, preventing the fluid in the hoisting-machine from flowing out faster than it could escape by leakage around the piston D, and while this piston may be packed and leakage entirely prevented, as such packing by its friction decreases the delicacy of the operation of the device as a safety-governor, it is preferable not to have it packed too closely, but sufficient to prevent any serious damage from the leakage under these conditions.

From the above description it will be seen that many and various modifications of the construction of the apparatus may be made by those skilled in the art and still embody the general principles and mode of operation of our invention, and in order that these may be more readily understood we will now describe the operation of the device, which, however, would be apparent to those skilled in the art.

The fluid is assumed to move in the direction indicated by the arrows, and the piston of course is free to move in the opening in the cylinder, and in Fig. 1 the movable plug controls the outflow from the throttle. The top and bottom areas of the piston D being equal and supposing no friction in the apparatus, it is evident that the piston will be in equilibrium and therefore at rest when the pressure on the bottom, plus the upward pull of the counterweight, equals the pressure of the fluid on the top through the pipe E, and it will thus be seen that to be in equilibrium and at rest the fluid-pressure on the two sides of the piston must differ by an amount equal to the upward pull of the counterweight, which difference is adjustable by increasing or decreasing the weight D³ or by moving the weight in and out on the lever.

It will be understood that the fluid-pressure on the top of the piston is equal to that on the inflow or initial side of the throttle, the pipe E forming a communication between these two portions, while the pressure on the other or outflow side of the throttle connects directly with the bottom of the piston through the passages c c'.

When the fluid is at rest, the piston D ascends by reason of the counterweight to the top of its stroke, thus opening the outlet C², and if now the fluid starts in motion in the direction of the arrows the pressure on the outlet side falls by reason of the hydraulic friction through the aperture or the throttle, thus reducing the pressure on the under side of the piston D until the excess of pressure on the top side of the piston is sufficient to overcome the counterweight, and the piston then descends, the plug gradually closing the outlet C², thus increasing the pressure under the piston until this pressure differs from the initial pressure at the inflow side of the throttle by an amount equivalent to the upward pull of the counterweight when the apparatus is in equilibrium, and the flow of the fluid through the throttle is then constant. When variations in the initial pressure or in the outlet-pressure occur, the plug closes or opens the outlet C², as may be necessary, maintaining a constant difference of pressure on the two sides of the throttle B. In cases where the initial and outlet pressures are reasonably constant the same effect could be produced by a difference of area of the upper and lower stems of the piston D, which would be a well-known substitute for the construction shown.

The operation of the apparatus illustrated in Figs. 2 and 3 is substantially the same as that in Fig. 1, except that it is arranged so that the flow of the fluid in either direction can be controlled. In this construction, instead of the piston having a single plug controlling a single outlet, the piston is arranged between the apertures G G' in the cylinder and opens or closes them by sliding over them. Thus, assuming the fluid to be moving in the direction of the arrows, it passes into the piston-chamber through the apertures G, thence through the throttle-aperture around to the other side of the piston, and thence out through the apertures G'. The piston tends to close the apertures G', which tendency is resisted in Fig. 2 by the weighted lever D² and in Fig. 4 by the fluid-pressure in the chamber I on the plunger K, it being understood that only one of the chambers I is operative, the other being rendered inoperative by any suitable means. It will be seen that with this construction, as in Fig. 1, as the pressure on the outlet side falls by reason of the hydraulic friction through the aperture of the throttle the pressure on that side of the piston will be reduced until the excess of pressure on the other side of the piston is sufficient to overcome the weight or pressure of the fluid-chamber, and the piston then gradually moves, closing the outlet G', increasing the pressure on this side of the piston until the pressure therein differs from the initial pressure by an amount equivalent to the counterpoise when the apparatus is in equilibrium and the flow through the throttle is constant, as before.

In Fig. 4 it will be seen that any desired difference of pressure can be maintained on both sides of the throttle by adjusting the pressure in the small pressure-chamber I or by changing the area of the plunger K. Of course, when the fluid flows in a direction opposite to that indicated by the arrows the operation is the same, but the reverse of that described, the plunger K being inoperative and the plunger K' being in action, and the port G' becomes the inlet-port and G the outlet-port.

Thus it will be seen that in carrying out our invention there is embodied therein as an essential feature a pipe having an orifice or aperture of fixed area, or an adjustable throttled orifice, a device for controlling the outflow of fluid from said orifice or throttle, (which device is shown in the form of a plug in Fig. 1 and in the form of the piston itself in Figs. 2 and 4,) and which device is subjected to the initial pressure of the fluid on one side, (as through the pipe E in Fig. 1 and through the direct pressure in Figs. 2 and 4,) and this device is subjected to the pressure of the outflow of fluid on the other side and to the action of a counterpoise, (as through the adjustable weighted lever or the fluid-chamber,) and it will thus be seen that the speed of the fluid is controlled by maintaining a constant difference of head on the two sides of the orifice or throttle.

Having thus described the general principles of our invention and set forth the various constructions in which it may be embodied, what we claim, and desire to secure by Letters Patent, is—

1. In an apparatus for controlling the speed of a fluid flowing through a pipe, the combination with a pipe having a throttle, of means controlling the outflow from said pipe, connections whereby said means are subjected to the initial fluid-pressure in said pipe on one side, and a counterbalancing device operating upon the other side of said means, substantially as described.

2. In an apparatus for controlling the speed of a fluid flowing through a pipe, the combination with a pipe having a throttle, of a piston controlling the outflow from said pipe, connections whereby said piston is subjected to the initial fluid-pressure in said pipe on one side, and a counterbalancing device operating upon the other side of the piston, substantially as described.

3. In an apparatus for controlling the speed of a fluid flowing through a pipe, the combination with a pipe having a throttle or orifice, of a cylinder connected to said pipe, a piston in said cylinder controlling the outflow from said pipe, connections with one side of the piston whereby it is subjected to the initial fluid-pressure, connections with the other side of the piston whereby it is subjected to the pressure of the outflow, and a counterbalance connected to the said piston, substantially as described.

4. In an apparatus for controlling the speed of a fluid flowing through a pipe, the combination with a pipe having a throttling device, of a cylinder, a piston working therein, a plug connected to the piston and controlling the outflow from the pipe, connections between the outflow and one side of the piston, connections between the initial fluid and the other side of the piston, and a counterpoise, substantially as described.

In testimony whereof we have signed our names to this specification in the presence of two subscribing witnesses.

THOS. E. BROWN, JR.
R. H. THORPE.

Witnesses:
HENRY L. BRANT,
HUGO A. HENKEL.